Sept. 23, 1924.
W. C. IFTIGER
COUPLING
Filed June 2, 1920
1,509,651
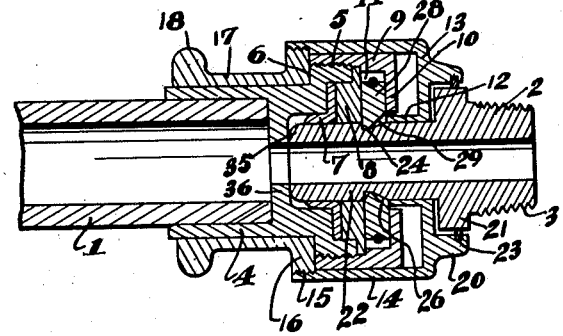
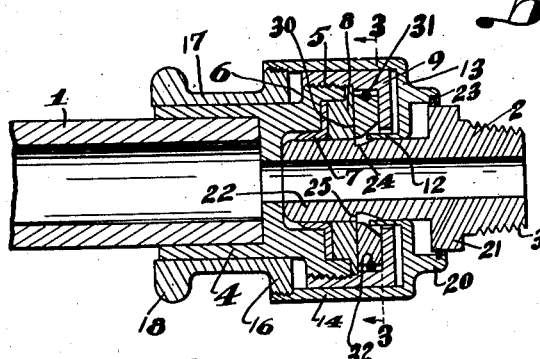
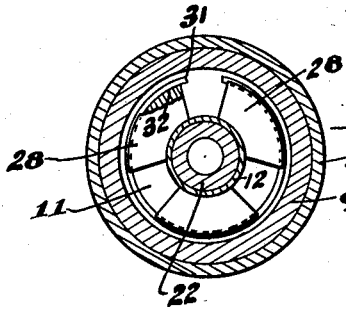
INVENTOR.
William C Iftiger
BY
ATTORNEYS Patented Sept. 23, 1924.

1,509,651

UNITED STATES PATENT OFFICE.

WILLIAM CARL IFTIGER, OF LOS ANGELES, CALIFORNIA.

COUPLING.

Application filed June 2, 1920. Serial No. 385,965.

*To all whom it may concern:*

Be it known that I, WILLIAM CARL IFTIGER, a citizen of the United States, residing at Los Angeles, in the county of Los Angeles and State of California, have invented new and useful Improvements in Couplings, of which the following is a specification.

This invention is a coupling arranged to provide a quick detachable connection. The coupling is particularly applicable for pipe connections and the like where it is desired to provide a quick detachable connection between a pipe or other conduit and a nipple or the like.

It is the object of the invention to provide a coupling of few parts and of simplified and inexpensive construction but which will be positive and efficient in its action and arranged to cause disengagement of the connected members through longitudinal shifting of the coupling relative to the connected members.

It is a further object of the invention to provide a coupling of this character in which longitudinal pull exerted upon the connected members in a direction to cause disengagement thereof will cause a firmer engaging action of the coupling.

The invention will be readily understood from the following description of the accompanying drawings, in which Figure 1 is a longitudinal section through the coupling with the same in operative position.

Fig. 2 is a similar view showing the coupling shifted so as to cause disengagement of the members united thereby.

Fig. 3 is a transverse section on the line 3—3 of Fig. 2.

The coupling is shown as employed for uniting a conduit 1 shown as a usual pipe with a nipple 2 provided with a usual threaded end 3 for connecting the same to any desired faucet or the like. The improved coupling comprises a sleeve 4 received over the end of conduit 1 and secured thereto in any desired manner as by soldering for example. This sleeve is provided with an enlarged threaded end 5 forming a shoulder 6 arranged to prevent longitudinal displacement of the slidable detaching member of the coupling to be hereinafter described.

A packing 7 is, preferably, provided at the end of sleeve 4, said packing, preferably, extending both longitudinally within the sleeve 4 and radially over the end thereof to the enlarged threaded end of said sleeve and having a feathered edge 7ª. A washer 8 is received against the packing 7, said washer having the axial opening therein in alinement with packing 7 and, preferably, extending at its periphery over the end of the threaded end of sleeve 4. A collar 9 is threaded on to the threaded end 5 of sleeve 4 and is provided at its outer end with an inwardly extending flange 10 spaced longitudinally from washer 8 so as to provide an annular jaw chamber 11 between said washer and flange. The axial opening in said flange is, preferably, of somewhat greater diameter than that of washer 8 so that an outwardly extending sleeve 12 may slide longitudinally within flange 10 with the opening through the sleeve 12 in longitudinal alinement with the opening in washer 8 so that the shank of the detachable nipple of the coupling may be received within said openings.

The sleeve 12 terminates at its outer end in a radially extending flange 13 spaced beyond flange 10 to permit of longitudinal movement of said flange and sleeve toward flange 10. The flange 13 at its periphery is provided with a rearwardly extending sleeve 14 which is received around collar 9 and provided at its rear end with a threaded connection 15. This threaded connection engages the threaded outer end 16 of a sliding collar 17 received over collar 4 and abutting at its outer end 16 which is, preferably, somewhat enlarged against the shoulder 6 formed upon sleeve 4. The collar 17 is, preferably, provided at its rear end with a knurled surface 18 arranged to be grasped by the fingers for shifting collar 17 and the sleeve 14 connected therewith longitudinally relative to the coupling for causing movement of sleeve 12 into and out of the jaw space provided between flange 10 and washer 8.

The flange 13 is, preferably, provided with an outwardly projecting annular lip 20 forming a receiving socket for the enlarged head 21 of nipple 2 adapted to have its shank 22 received within the opening of the coupling member as thus described. A washer 23 may be provided in the surface of the socket formed by lip 20, said washer being arranged to engage the head of the nipple to provide a leak proof packing. The nipple 2 is provided with an annular groove 24 in the shank thereof, said groove having a radially extending rear wall 25 and an inclined front wall 26. Jaws received within the jaw space 11 of the coupling member are arranged to be received within groove 24 for detachably locking the nipple within the coupling members, said jaws being arranged to impinge against the end 25 of the groove for preventing longitudinal displacement of the nipple until the jaws have been retracted within the jaw space beyond the periphery of the nipple shank.

The jaws are shown at 28 as a plurality of jaws received within space 11, the nipple engaging ends of said jaws being, preferably, tapered at the front thereof so that when the nipple is inserted within the coupling member the shank of the same engaging the tapered surfaces 29 will force the jaws back into the jaw space 11. The jaws are normally yieldably urged outwardly to cause abutment of the rear edges 30 of the nipple engaging ends of the jaws against the wall 25 of the groove within the nipple shank.

For this purpose a spring 31 shown as an annular spring strip extends around the outer circumferences of the jaws so as to yieldably urge said jaws toward one another. This spring strip may be positioned within a groove 32 provided in the outer peripheries of the jaws.

In operation when it is desired to unite the coupling member carrying the conduit 1 with the nipple 2 the shank of the latter is inserted in the axial opening provided in the coupling member, the parts being so arranged that the surface of the nipple will fit tightly within the opening in packing 7, washer 8 and sleeve 12 with the end 35 of the nipple resting against an interior annular shoulder 36 provided upon sleeve 4. As the nipple moves past jaws 28 the latter will be retracted within the jaw space of the coupling member until the groove 24 is in alinement with the jaws when the latter will be urged outwardly by spring 31 into the groove provided in the nipple. The nipple will then be positively held against withdrawn from the coupling member since any force exerted upon the nipple in a direction to withdraw it from the coupling member will cause the wall 25 of the groove in the nipple to impinge against the jaws.

When it is desired to detach the nipple from the coupling member it is only necessary to grasp the knurled end of collar 17 and slide the latter rearwardly relative to the coupling member and the nipple. This movement of collar 17 will cause a rearward movement of sleeve 12 whereby the latter will engage the front tapering surfaces 29 of the jaws for retracting the jaws within the jaw space and beyond the periphery of the shank of the nipple. With the jaws thus held in retracted position the nipple may be readily removed from the coupling member. Thus it will be seen that I have provided a quick detachable connection arranged to be employed in a coupling for conduit members and the like, this connection being so arranged that the force exerted in a direction to separate the members connected thereby will cause a more intimate engagement of the coupling connection.

Various changes may be made without departing from the spirit of the invention as claimed.

What is claimed is:

1. A coupling comprising a member having a socket and engaging means carried by said member and yieldably urged outwardly into said socket, a collar slidable upon said member and extending over the end of said socket with a sleeve extending rearwardly within said socket and arranged to engage said engaging means so as to retract the latter within said socket by longitudinal rearward movement of said collar upon said member, and a second member received within said socket and having a groove adapted to be engaged by said engaging means.

2. A coupling comprising a member having a socket, a washer within said socket, a sleeve received about said member and having a flange spaced longitudinally from said washer, jaws within the space between said washer and flange yieldably urged outwardly into said socket, a collar slidable upon said member and extending over the end of said socket with a sleeve extending rearwardly within said socket and arranged to engage said jaws so as to retract the latter within said socket by longitudinal rearward movement of said collar upon said member, and a second member received within said socket and having a groove adapted to be engaged by said jaws.

3. A coupling comprising a member having a socket, jaws mounted in said member and yieldably urged outwardly into said socket, said jaws having tapered front sides, a collar slidable upon said member and extending over the end of said socket with a sleeve extending rearwardly within said socket and arranged to engage the tapered surfaces of said jaws so as to retract the latter within said socket by longitudinal rearward movement of said collar upon said member, and a second member received within said socket and having a groove adapted to be engaged by said jaws.

4. A coupling comprising a member having a socket, jaws mounted in said member and yieldably urged toward the center into said socket, said jaws having tapered front sides, a collar slidable upon said member and extending over the end of said socket with a sleeve extending rearwardly within said socket and arranged to engage the tapered surfaces of said jaws so as to retract the latter within said socket by longitudinal rearward movement of said collar upon said member, a second member received within said socket and having a groove adapted to be engaged by said jaws, a second collar within the member, a washer within the member and co-operating with the second collar to slidably receive the jaws, and a packing ring between the member and washer and having a feathered edge.

5. A coupling comprising a member having a socket formed therein, a second member insertable into said socket, locking members within the socket normally urged to engage the second member to prevent withdrawal of the latter from the socket, and a sleeve movable longitudinally on the members to retract said locking members against the action of their urging means.

6. A coupling comprising a member having a socket formed therein, a second member insertable into said socket and having a shouldered groove formed therein, jaws slidably sustained in the socket for radial movement to engage or disengage the second member within said groove, means for urging the jaws toward said groove, and a sleeve slidable on the members to engage and move said jaws radially against the action of said urging means to withdraw the same from said groove.

7. A coupling comprising a member having a socket formed therein, a second member insertable into said socket and having a shouldered groove formed therein, jaws slidably sustained in the socket for radial movement to engage or disengage the second member within said groove, a circular spring engaging the periphery of the jaws for urging the latter toward said groove, and a sleeve slidable on the members to engage and move said jaws radially against the action of said spring to withdraw the same from said groove.

8. A coupling comprising a member having a socket formed therein, a second member insertable into said socket and having a shouldered groove formed therein, jaws slidably sustained in the socket for radial movement to engage or disengage said member within said groove, said jaws being formed with tapering surfaces, means for urging the jaws toward said grooves, and a member slidable on the members to engage the tapered surfaces of the jaws for moving the latter radially against the action of said urging means to withdraw the same from said groove.

In testimony whereof I have signed my name to this specification.

WILLIAM CARL IFTIGER.